Jan. 28, 1964 W. J. WASYLENKO 3,119,989

ELECTROMAGNETIC TRANSDUCER APPARATUS

Filed Jan. 3, 1961 2 Sheets-Sheet 1

| SOLONOID | SI | S2 | S3 | S4 |
|---|---|---|---|---|
| CODING | 1 | 2 | 3 | 3 |
| TRACK 0 | | HOME | | |
| TRACK 1 | O | | | |
| TRACK 2 | | O | | |
| TRACK 3 | | | O | |
| TRACK 4 | O | | O | |
| TRACK 5 | | O | O | |
| TRACK 6 | | | O | O |
| TRACK 7 | O | | O | O |
| TRACK 8 | | O | O | O |
| TRACK 9 | O | O | O | O |

INVENTOR.
WILLIAM J. WASYLENKO

BY Carl Fissell Jr.

AGENT

INVENTOR.
WILLIAM J. WASYLENKO
BY *Carl Fissell Jr.*
AGENT 3,119,989

ELECTROMAGNETIC TRANSDUCER APPARATUS

William J. Wasylenko, Philadelphia, Pa., assignor to Burroughs Corporation, Detroit, Mich., a corporation of Michigan Filed Jan. 3, 1961, Ser. No. 80,395
3 Claims. (Cl. 340—174.1)

The present invention relates to apparatus for positioning an electromagnetic transducer adjacent the surface of a recording medium and more particularly, to apparatus for automatically and incrementally advancing the transducer across a recording media in response to track selection information received by the apparatus. With still more particularity, the present invention has to do with a gimbal mounted electromagnetic transducer assembly including one or more read-write heads and electromagnetic signal responsive means for advancing and retracting the transducer over the record media in accordance with electrical information applied thereto.

It is an important object of the present invention to provide a new and improved automatic track selection mechanism for use with electromagnetic transducers employed with record memory units.

It is another important object of the invention to provide electromechanical position translating means for converting data in the form of electrical impulses to mechanical movement so as to incrementally position a transducer adjacent a selected discrete recording area on a record member.

In accordance with the foregoing objects and first briefly described herein, the present invention comprises an electromagnetic transducer including one or more read-record head members and means for suspending the transducer by gimbals in a frame which is spring loaded in one direction and which is incrementally movable in the opposite direction by means of a metal tape which is wound back and forth between a plurality of pulleys, each pulley being arcuately rockable by means of a solenoid associated therewith so as to cause the tape and thus the transducer to be incrementally moved through a desired distance depending on which one or more of the electromagnets has been actuated, thus to position the transducer adjacent a selected recording area on the surface of a record medium.

A better understanding of the present invention may be had from the following detailed description when read in conjunction with the accompanying drawings, in which.

Figures 1, 2, 3, 4:
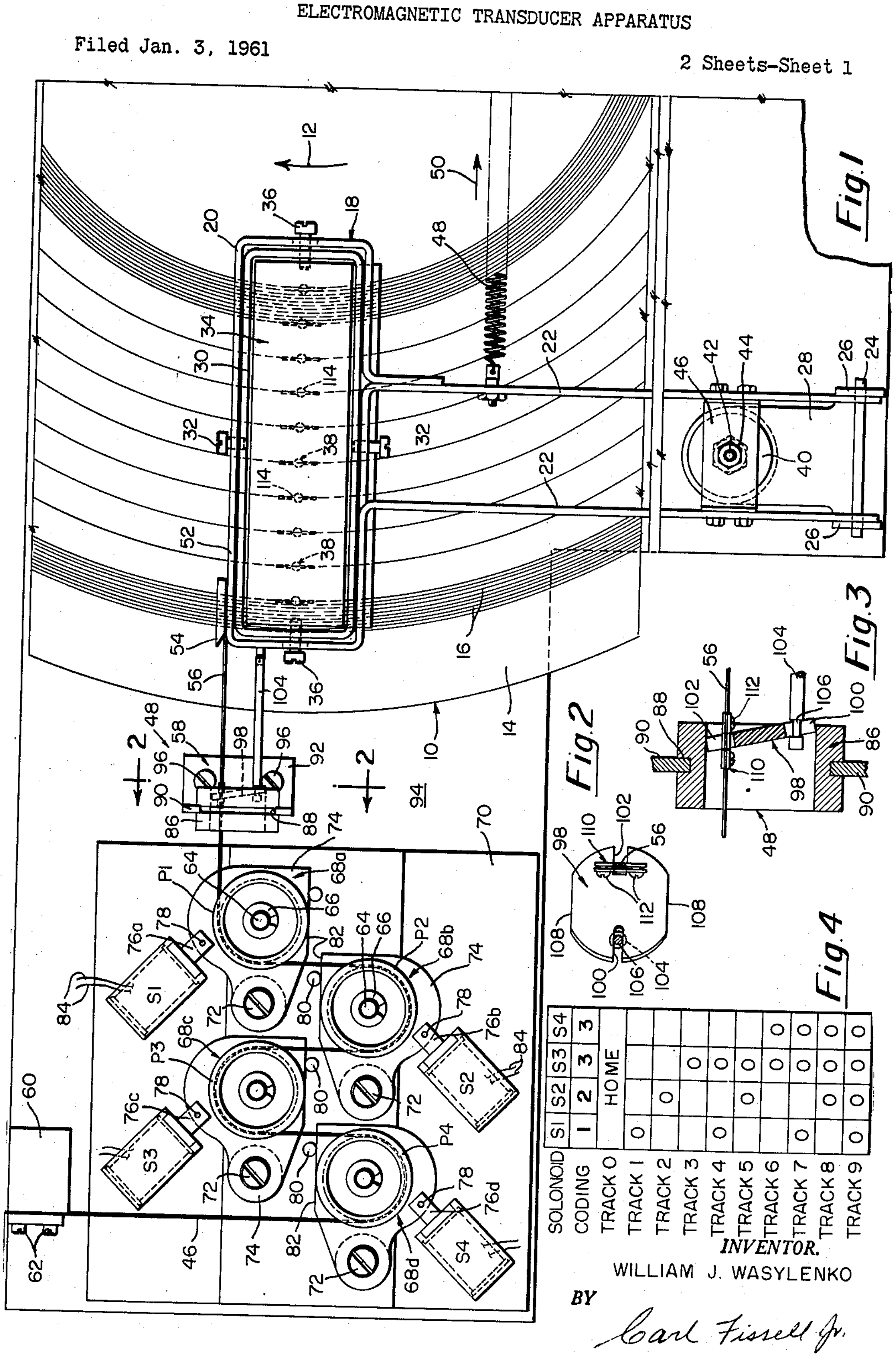
FIG. 1 is a plan view of the assembled apparatus embodying the present invention.
FIG. 2 is a detail view along the line 2—2 of FIG. 1.
FIG. 3 is a sectional view of the damper mechanism for the present invention.
FIG. 4 is a schematic view of a coding arrangement for use with the present invention.

As is seen by reference to FIG. 1 of the drawings, the present invention is embodied in apparatus including a rotatable disc-like member 10 which is rotatably driven in the direction of the arrow 12 by means, not shown, and which is provided with a magnetizable recording surface 14 thereon. The surface 14 when recorded upon in the conventional manner, is adapted to provide one or more magnetized recording-reproducing tracks 16. A transducer or head supporting structure 18 includes a gimbal mounting comprising a first rectangular member 20 provided with parallel leg portions forming loading arms or bars 22 extending outwardly therefrom, and terminating at a transverse pivot member 24 which extends between the upright arms 26—26 of a supporting bracket 28 and tends to rigidify the members 22. A second rectangular member 30 is pivotally mounted to the member 20 by means of the oppositely disposed pivot pins 32 which are adjustably positioned on opposite parallel sides of member 30. A transducer member 34 is pivotally mounted at its opposite ends to the member 30 by means of pins 36 which extend inwardly through member 30 and into the member 34. In the present embodiment, member 34 is rectangular in shape and includes a plurality of electromagnetic recording heads 38 of ferrite or other similar material, each one of which is adapted to be positioned over a respective one of the tracks 16 on the recording member 10. Ten heads are shown in this preferred illustrated embodiment. A lesser or a greater number of heads could be employed if desired.

The parallel loading arms 22 which extend backwardly from the transducer gimbal supporting structure 18 permit the entire assembly to be pivoted vertically about the pivot 24 and horizontally about a pivot bearing 40. Extending vertically downward from the bearing 40 is a shaft 42 fixed at one end by means of a nut 44 to a strengthening bracket 46 connecting the parallel loading arms 22. The lower end of the shaft 42 has attached thereto a loading weight (not shown). Secured to one of the parallel arms 22 is a restoring coil spring 48 which is fixed at one end thereto and is attached at its opposite end to another portion of the base structure which is not shown here. The biasing spring 48 tends to pull the transducer assembly in the direction of the arrow 50, radially across the recording member 10.

Attached at the upper left-hand corner 52 of the transducer supporting gimbal structure 18 is an attachment means 54 which is adapted to secure one end of a piece of metal tape 56, such as Dynavar tape, thereto. The tape 56 extends leftwardly from the attachment means 54 and into and through a damper 58, the purpose and operation of which will be described presently.

From the damper the tape is wound in a zig-zag pattern back and forth around four pulleys identified hereinafter as P1, P2, P3 and P4, respectively. The pulleys are oriented and arranged with respect to the transducer assembly such that the tape makes a 90° or right angle turn over the first pulley P1, and then is wrapped 180° around the second, third, and fourth pulleys, P2, P3 and P4 to terminate at an adjustable tensioning block 60 to which the tape is attached by means of screws 62, in a conventional manner.

Each of the pulleys P1–P4 is rotatably mounted, by means of a stub shaft 64 and a C-ring 66, on separate movable mounting plates *68a–68d*, respectively. Each of the plates is pivoted to a base member 70, as by a bolt 72. Secured to the arcuate portion 74 of each of the plates *68a–68d*, as viewed in FIG. 1, is an energizing solenoid S1, S2, S3 and S4, respectively. The core plunger members *76a–76d*, respectively, of each solenoid is connected to the respective curved periphery 74 of its associated mounting plate by means of a pin 78. A stop member 80 located adjacent the flat side 82 of each plate limits the arcuate travel of each of the plates in response to the movement of the plungers *76a–76d*. Electrical leads 84 for each solenoid extend therefrom for connection to suitable energizing apparatus or electrical circuits, such as a computer (not shown) for controlling the actuation of the herein described transducer random access memory selection mechanism.

The damper mechanism 58 for the present apparatus includes a self aligning rigid cylindrical member 86 of suitable material such as metal, plastic, etc., having an annular groove 88, FIG. 3, therearound. The cylinder 86 is receivable in loose-fit relationship between the upstanding arms 90—90 of a U-shaped supporting member 92. The latter is attached to the base member 94 by bolts 96. A rigid disc-like member 98, of nylon or other similar suitable material, is provided with oppositely disposed notches 100 and 102, FIG. 2, and is disposed within the cylinder 86 as seen in FIGS. 1 and 3. A hinged pusher rod 104 of metal, for example, is attached at the hinged end to the member 20 of the gimbal mounting assembly 18 and at its other end by means of the undercut portion 106, FIG. 3, to the slot or notch 100 in the disc 98. The disc 98 has a generally circular shape with cords 108 cropped off opposite sides for clearance purposes. The disc is attached to the tape 56 by means of an H-clamp 110, which straddles the notch 102, and bolts or screws 112 secured to the opposite sides thereof. As seen in FIGS. 1 and 3, the disc 98 is positioned at a slight angle within the bore of the cylinder 86 in order to provide a slight interference fit therebetween.

In the present preferred embodiment, as seen in FIG. 1, each of the ten heads 38 is spaced ten track pitches apart. The track pitch is $\frac{1}{32}$ of an inch. The head cores 114 are approximately .025 inch thick. The bearing pad (not shown), i.e., the surface portion of the head adjacent the disc is machined to produce a bi-planar surface such that, when air guiding, or when disposed in air bearing relationship to said disc, the surface containing the head gaps is parallel to the disc surface.

The operating gaps of the solenoid plungers *76a–76d* are preset for a desired amount of travel when the associated coil is energized. Solenoids S1 and S2 are set at $\frac{1}{32}$ of an inch or one track pitch. These two solenoids S1 and S2 may be said to have a one to one ratio with respect to the track pitch. Solenoids S3 and S4 are set at $\frac{3}{64}$ of an inch or one and one-half track pitches. Thus, solenoids S3 and S4 effectively have a one and one-half to one ratio to the track pitch. With the apparatus at rest, i.e., with all of the solenoids deenergized, the head gimbal mounting structure 18 is at the "home" position, FIG. 5*a*.

Figure 5:
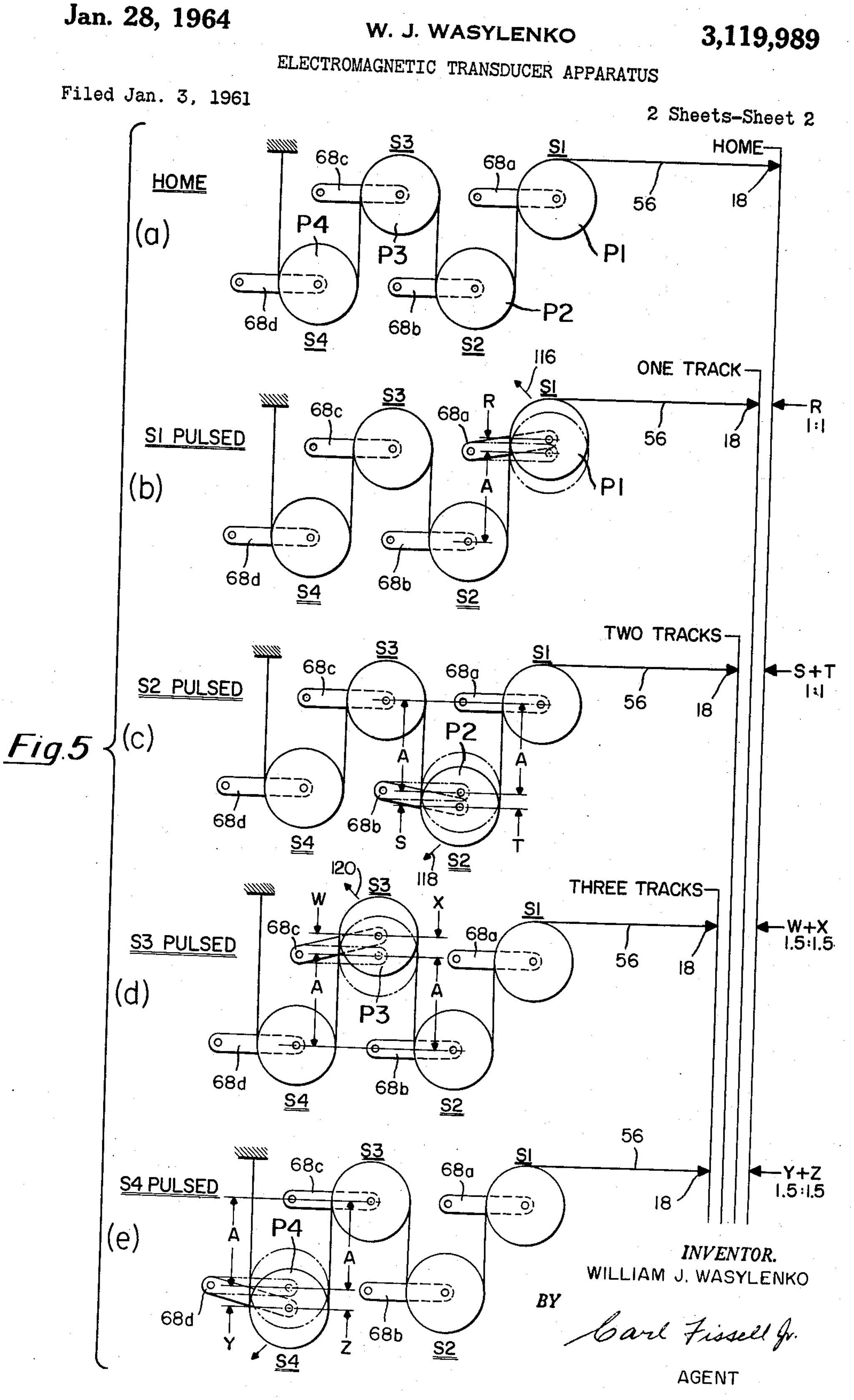
FIG. 5 is a diagrammatic view illustrating various operating conditions of the electromagnetic controls for the present invention.

For convenience of illustration and for visual clarity, the solenoids S1–S4 have been omitted from FIG. 5. Only the pulleys P1–P4 and their associated plates *68a–68d* together with the drive tape 56 is shown. The specific solenoid being energized is designated by the words "S1 pulsed," "S2 pulsed," etc., at the far left of each of the views in FIG. 5.

Referring to FIG. 5*b*, it is seen that energization of solenoid S1 causes plate 68*a* to rock pulley P1, in the direction of the arrow 116, from its dotted to its full line position. Pulleys P2, P3 and P4 remain idle during this operation. This movement effects a single discrete length of tape designated A–R and will pull the head structure 18 leftwardly against the tension of the loading-restoring spring 48 from the "home" position to the "first track" position.

Solenoid S2 when energized or pulsed causes plate 68*b* to rock pulley P2 from its dotted to its full line position, FIG. 5*c*, in the direction of arrow 118. Pulley P1 acts as an idler pulley while P3 and P4 remain stationary. Although a one to one relationship exists as before between the plunger gap and the track pitch or position, pulley P2 acts on two substantially equal and discrete lengths of tape designated A–S and A–T. Thus the head structure 18 will be pulled leftwardly a distance equivalent to two track positions.

Pulsing solenoid S3, FIG. 5*d*, will move pulley P3 from its dotted to its full line position in the direction of arrow 120 thereby effecting two tape lengths identified as A–W and A–X, which, since a one and one-half to one ratio exists, will move the head structure three track pitches. Pulleys P1 and P2 act as idlers in the manner hereinbefore mentioned. P4 remains stationary.

Likewise, when solenoid S4 is energized or pulsed, FIG. 5*e*, its pulley P4 acts on two lengths of tape A–Y and A–Z, moving the pulley in the direction of arrow 122. Pulleys P1, P2 and P3 idle as before described. In this manner the head structure 18 is moved a distance equivalent to three track pitches.

When the tape 56 moves the head assembly 18, the velocity of the pusher rod 104 and the H-clamp 110 is approximately equal. When the head assembly 18 attempts to overtravel, the velocity of the pusher rod 104 is greater than that of the H-clamp 110. Hence, a wedging action is produced between the disc 98 and the bore of the cylinder 86 and a dragging force is effected which resists the momentum of the head structure 18. The restoring spring 48 will urge the structure 18 to the right, FIG. 1, to unwedge or unlock the disc 98. The pusher-rod is pivoted since the motion of the head is not completely linear.

Referring to the chart of FIG. 4, it can be seen that by applying pulses to the proper solenoid or combination of solenoids in a 1–2–3–3– binary code arrangement, any of ten track positions may be selected. Assuming ten heads to be used, as herein described, a total of 100 tracks can be operated upon. The solenoid control circuit (not shown) may be so designed that after "pulling in" the plungers *76a–76d* are held in position by a small holding current. This arrangement permits random selection of tracks without homing or zeorizing the head mounting structure—it being recalled that the head is constantly moved against the tension of spring 48 which will restore the head to "home" when the solenoids are all deenergized.

It is possible to set the four solenoid gaps in a full binary manner, i.e., 1, 2, 4 and 8 track pitches apart, thus to permit a total of 16 tracks to be serviced by each head. The ten track per head design of the preferred embodiment is for convenience only.

What is claimed is:

1. Random accesss memory apparatus comprising, (*a*) one or more electromagnetic transducers, (*b*) a frame assembly including loading means supporting said transducers for movement about at least two substantially perpendicular axes adjacent the surface of a record member with which said transducers may be operably associated, (*c*) tension means urging said transducers laterally in one direction over said record member, (*d*) a flexible member secured at one end to said transducer frame assembly and having its opposite end secured to a fixed support, (*e*) a plurality of electromagnets each of which includes a movable plunger mechanism, (*f*) a pulley mount carrying a rotatable pulley wheel rockably disposed adjacent each electromagnet, (*g*) said flexible member being wound in a zig-zag path back and forth around portions of each pulley wheel, (*h*) damping means intermediate the ends of said flexible member for limiting any over-travel of said transducer and, (*i*) means operably interconnecting each said pulley mount with the plunger of a respective one of said electromagnets effective when said electromagnet is energized to rock said pulley wheel so as to vary the effective length of said flexible member in a manner moving said transducers laterally against the tension of said urging means thereby selectively positioning said transducers relative to said record member.

2. Random access memory apparatus comprising, (*a*) one or more electromagnetic transducers, (*b*) a frame assembly including parallel loading arms supporting said transducers for movement about at least two substantially perpendicular axes adjacent the surface of a record member with which said transducers may be operably associated, (*c*) spring means urging said transducers laterally in one direction over said record member, (*d*) a flexible member secured at one end to said transducer frame assembly and having its opposite end secured to a fixed support, (e) a plurality of electromagnets each of which includes a movable plunger mechanism, (f) a pulley mount carrying a rotatable pulley wheel rockably disposed adjacent each electromagnet, (g) said flexible member being wound in a zig-zag path back and forth around portions of each pulley wheel, (h) a damping member intermediate the ends of said flexible member including means coupling said transducer supporting frame thereto and further means interengaging said flexible member and said damping member effective to limit any over-travel of said transducers, and (i) means operably interconnecting each said pulley mount with the plunger of a respective electromagnet whereby when said electromagnet is energized said pulley wheel is arcuately rocked effectively shortening or lengthening said flexible member in a manner causing said transducer to move laterally against the tension of said spring means thereby to position said transducers relative to said record member.

3. Random access memory apparatus comprising, (a) one or more electromagnetic transducers, (b) a frame assembly including a loading bar supporting said transducers for movement about at least two substantially perpendicular axes adjacent the surface of a record member with which said transducers are operably associated, (c) a spring urging said transducers laterally in one direction over said record medium, (d) a flexible member secured at one end to said transducer frame assembly and having its opposite end secured to a fixed support, (e) a plurality of electromagnets each of which includes a movable plunger mechanism, (f) a pulley mount carrying a rotatable pulley wheel rockably disposed adjacent each electromagnet, (g) said flexible member being wound in a zig-zag path back and forth around portions of each pulley wheel, (h) a damping member intermediate said transducer supporting frame and said electromagnets for limiting any over-travel of said transducer, (i) said damping member including a movable traveler secured to and movable with said flexible member and a pusher rod interconnecting said traveler and said transducer supporting frame effective to immobilize said traveler when said transducer tends to over-travel, and (j) means operably interconnecting each pulley mount with the plunger of a respective one of said electromagnets effective when an electromagnet is energized to rock said pulley wheel so as to shorten or lengthen said flexible member in a manner causing said transducers to move laterally against the tension of said spring thereby to position said transducers relative to said record member.

References Cited in the file of this patent

UNITED STATES PATENTS

| | | |
|---|---|---|
| 3,005,675 | Ledin et al. | Oct. 24, 1961 |
| 3,021,512 | Welsh et al. | Feb. 13, 1962 |